(12) United States Patent
Wei et al.

(10) Patent No.: US 8,575,902 B1
(45) Date of Patent: Nov. 5, 2013

(54) DEACTIVATING PARALLEL MOSFETS TO IMPROVE LIGHT LOAD EFFICIENCY

(75) Inventors: Jia Wei, Cary, NC (US); John Kleine, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 1091 days.

(21) Appl. No.: 12/131,531

(22) Filed: Jun. 2, 2008

Related U.S. Application Data

(60) Provisional application No. 60/941,688, filed on Jun. 3, 2007.

(51) Int. Cl.
*G05F 1/00* (2006.01)

(52) U.S. Cl.
USPC .......................... 323/269; 323/272

(58) Field of Classification Search
USPC .......................... 323/269, 272, 282
See application file for complete search history.

(56) References Cited

U.S. PATENT DOCUMENTS

| | | | |
|---|---|---|---|
| 6,667,603 B2* | 12/2003 | Hiraki et al. | 323/272 |
| 7,456,618 B2 | 11/2008 | Jain | |
| 7,489,117 B2 | 2/2009 | Jain | |
| 8,148,957 B2* | 4/2012 | Zhang | 323/272 |
| 2003/0155898 A1* | 8/2003 | Olsen et al. | 323/283 |
| 2005/0184712 A1* | 8/2005 | Wei et al. | 323/282 |
| 2005/0212497 A1* | 9/2005 | Cha | 323/272 |

OTHER PUBLICATIONS

Wei et al., Sep. 2004, IEEE, APEC '04 19th Annual IEEE, 1294-1300.*
Wei et al., Sep. 2004, IEEE, APEC '04 19th Annual IEEE, 1294-1300.*

\* cited by examiner

*Primary Examiner* — Jue Zhang
(74) *Attorney, Agent, or Firm* — Fogg & Powers LLC

(57) ABSTRACT

Circuits, methods, and apparatus that reduce the power required to drive transistors in switching power supply regulators under various load conditions. One example provides a power supply regulator having multiple parallel transistors in order to reduce series on resistance. When the regulator is lightly loaded, a reduced number of devices are driven by the regulator. That is, one or more devices are not driven, rather their gates are held at a voltage such that the devices remain in the off or non-conductive state. When the regulator is more heavily loaded, more or all of the devices are driven.

16 Claims, 5 Drawing Sheets

DEACTIVATING PARALLEL MOSFETS TO IMPROVE LIGHT LOAD EFFICIENCY

CROSS-REFERENCES TO RELATED APPLICATIONS

This application claims the benefit of U.S. provisional application No. 60/941,688, filed Jun. 3, 2007, which is incorporated by reference.

BACKGROUND

The present invention relates generally to power supply regulators, and more particularly to deactivating power MOSFETs when power supply regulators are lightly loaded.

Power supply regulators receive an input power supply at a first voltage and convert it to a regulated output power supply having a second voltage. It is desirable to perform this conversion efficiently, particularly in mobile applications where improved conversion efficiency results in longer battery life. That is, it is desirable to reduce the power consumed in converting the input voltage to a regulated output voltage.

Much of the power consumed in generating a regulated output voltage with a switching power supply regulator is consumed by driving power MOSFETs. These devices are typically driven with a pulse-width modulated signal, where the pulse-width is modulated by a feedback loop that tracks the regulated output voltage. In order to limit the power consumed by these MOSFETs, it is desirable to limit their size. Specifically, smaller devices having smaller gate capacitances take less power to drive.

Power is also lost in the MOSFETs themselves. When these devices conduct current, they provide a finite resistance known as RDSON. The current through the device flows through this resistance thus dissipating power. Therefore, it is also desirable to reduce the series resistance of the MOSFET transistors when they are in the on or conducting state.

Accordingly, there are rationale indicating that power MOSFET devices in a switching regulator should be large and others indicating that they should be small. However, one of these rationales becomes more important than the other under various load conditions placed on the regulator.

Thus, what is needed are circuits, methods, and apparatus that can vary the effective size of power MOSFETs under various load conditions.

SUMMARY

Accordingly, embodiments of the present invention provide circuits, methods, and apparatus that reduce the power required to drive transistors in switching power supply regulators under various load conditions. A specific embodiment of the present invention provides a power supply regulator having multiple parallel transistors in order to reduce series on resistance. When the regulator is lightly loaded, a reduced number of devices are driven by the regulator. That is, one or more devices are not driven, rather their gates are held at a voltage such that the devices remain in the off or non-conductive state. When the regulator is more heavily loaded, more or all of the devices are driven.

Another exemplary embodiment of the present invention receives an indication of a current being drawn by a load. The indication may be received from the load itself. For example, one or more signals may be received from a load such as a microprocessor. Also, one or more signals may be received from another circuit besides the load. Alternately, the indication may be received by sensing a current, for example a current in one or more inductors that are part of a switching regulator circuit. The indication of the current level drawn by the load may indicate two or more levels of current load. For example, the indication may be that the current is below a first threshold, or between the first and a second threshold, or above the second threshold. To avoid oscillations, there may be an amount of hysteresis associated with one or more of these thresholds. In this embodiment of the present invention, the number of power devices that are driven varies with the load. For example, as the load current increases, the number of parallel devices that are driven is increased. The indication or signals may be analog, digital, or other type of logic signal or signals. For example, they may be one or more analog signals or one or more binary signals. They may alternately be one or more logic signals having more than two logic levels.

Embodiments of the present invention may be employed in single or multiphase systems. In single-phase systems, a number of parallel transistors may be driven, where the number is varied according to load conditions. That is, as the load current increases, the number of transistors driven increases. In various embodiments of the invention, there may be two, three, four or more levels of load current where different numbers of devices are driven.

In multiphase systems, the number of phases and the number of driven devices may vary. For example, as the current is increased, more devices in one phase may be enabled. As the load current is further increased, the number of phases may be increased.

The parallel devices may be MOSFET, bipolar, or other types of transistors. The devices may be pull-down devices, pull-up devices, or both. The devices may be the same size, or they may be scaled in size.

Various embodiments of the present invention may incorporate one or more of these or the other features described herein. A better understanding of the nature and advantages of the present invention may be gained with reference to the following detailed description and the accompanying drawings.

DESCRIPTION OF EXEMPLARY EMBODIMENTS

Figure 1A:
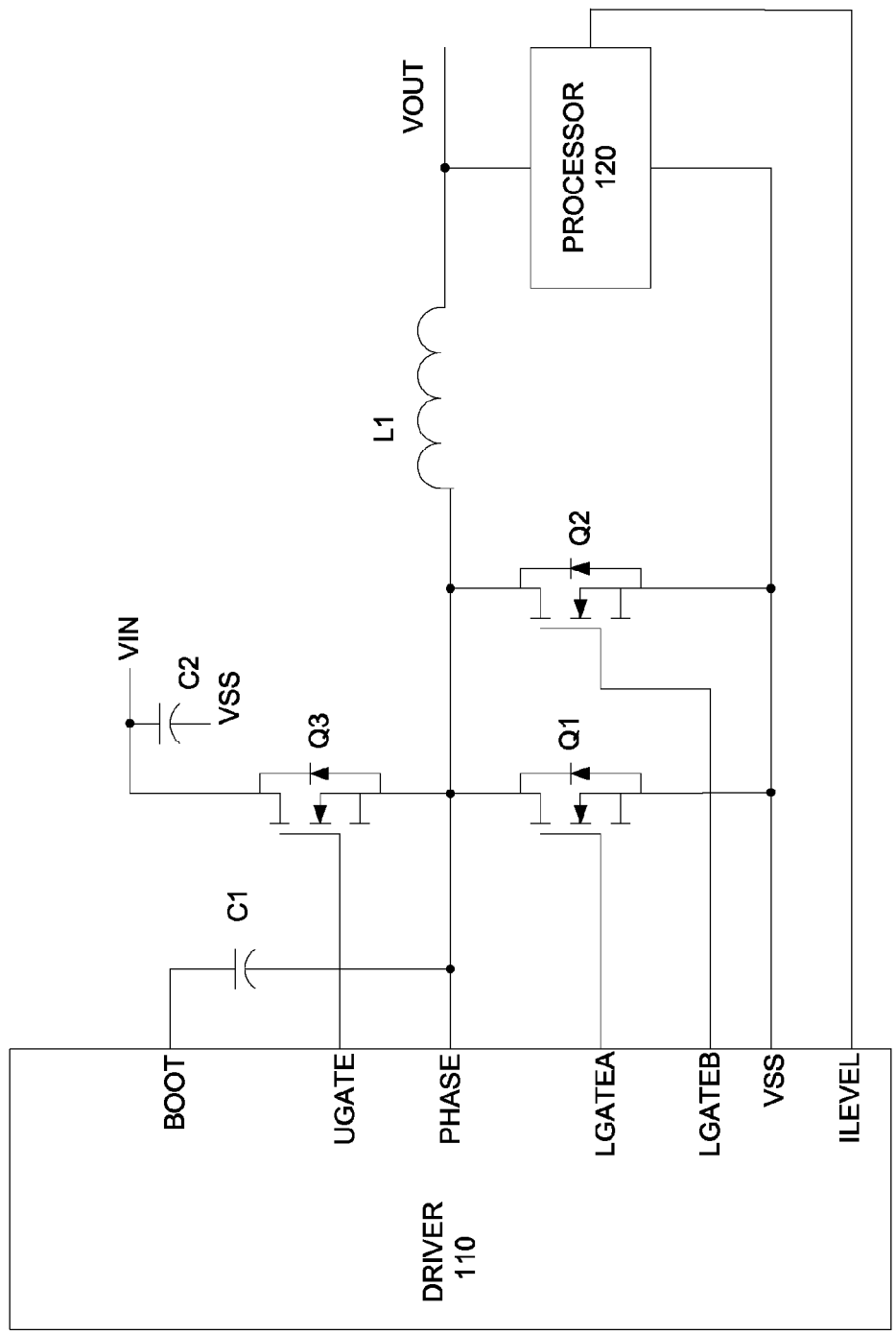
FIG. 1A is a block diagram illustrating a single phase power supply regulator according to an embodiment of the present invention.

FIG. 1A is a block diagram illustrating a power supply regulator according to an embodiment of the present invention. This figure includes a switching regulator driver 110, power MOSFETs Q1, Q2, and Q3, an inductor L1, and a load, shown here as processor 120. The driver 110 in conjunction with the power MOSFETs convert an unregulated voltage VIN to a regulated voltage VOUT which is provided to the processor 120. The processor may be a processor such as those manufactured by Intel Corporation in Santa Clara, Calif.

It is desirable that the unregulated voltage the CNN be converted to a regulated voltage output in an efficient manner. This is particularly true in mobile applications, where a high efficiency helps preserve battery power.

One way to improve efficiency is to reduce the series on resistance of the MOSFET's. This is true for both the pull-up devices and pulled down on devices, though particularly so for the pull-down devices. One way to reduce the series on resistance is to include multiple devices in parallel, such as Q1 and Q2 in this figure. The use of two devices halves the series on resistance in the pull-down path. While two parallel transistors have been shown in this figure, in other embodiments of the present invention, other numbers of transistors may be included. Further, while individual outputs LGATEA and LGATEB are shown driving transistors Q1 and Q2, each output LGATEA and LGATEB may drive more than one transistor. Alternately, various embodiments of the present invention may include three or more driver outputs. Also, while in this example, multiple parallel devices are shown for the pull-down path, multiple parallel devices that are selectively enabled may be used for the pull-up device, or for both the pull-up and pull-down devices.

Unfortunately, including multiple devices in parallel has a disadvantage in that the cumulative gate capacitance that needs to be driven by the driver 110 increases correspondingly as the number of devices increases. Driving this gate capacitance wastes power and lowers overall efficiency.

Under some circumstances, the load draws a light enough current that one or more of the multiple parallel devices are not needed. More specifically, under light loads, the advantage of having a low series on resistance is outweighed by the disadvantage of having a large gate capacitance. In this case, to save power in the MOSFET drivers, one or more of the multiple parallel transistors are not driven. This improves the overall efficiency of the power conversion process. In a specific embodiment of the present invention, efficiency improvements of over 8% have been achieved.

Whether the load is drawing a light enough current that one or more multiple parallel devices are not needed may be determined in a number of ways in various embodiments of the present invention. For example, the processor of 120 may provide an ILEVEL signal to the driver 110. When the processor 120 is operating at a relative low speed, the current that it draws is correspondingly reduced. In such circumstance, the processor 120 provides a signal on ILEVEL indicating that the driver 110 does not need to drive all the MOSFET devices. The driver accordingly drives one or more of the gates of the power devices to a level where the one or more devices are turned off.

In other embodiments of the present invention, the processor 120 may provide multiple signals indicating its load level. In such a case, depending on load level, different numbers of parallel transistors may be driven or turned off.

Figure 1B:
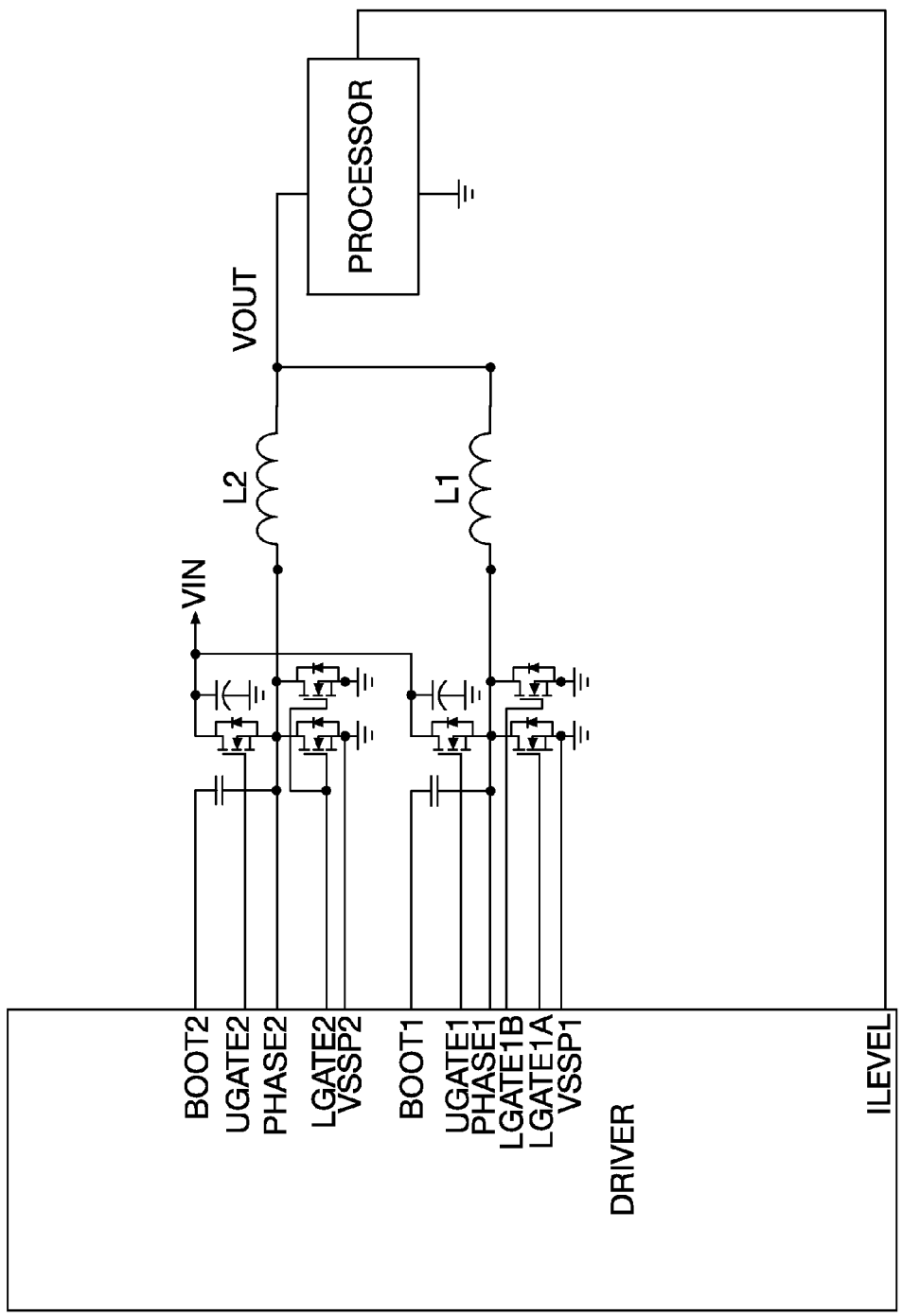
FIG. 1B is a block diagram illustrating a multi-phase power supply regulator according to an embodiment of the present invention.

The circuit as illustrated in FIG. 1A is a single phase power regulator. The present invention may also be used to improve multi-phase regulators. FIG. 1B is a block diagram illustrating an example of such a multi-phase power supply regulator. As shown the multi-phase power supply regulator includes multiple circuits from the single phase power regulator of FIG. 1A. As such, power devices drive the processor or other load through separate inductors for each phase of the multi-phase power supply. The inductor for each phase can be connected to the output VOUT. In such a configuration, depending on the current drawn by the load, different numbers of phases and different numbers of parallel devices in one or more phases may be enabled or disabled.

Figure 2B:
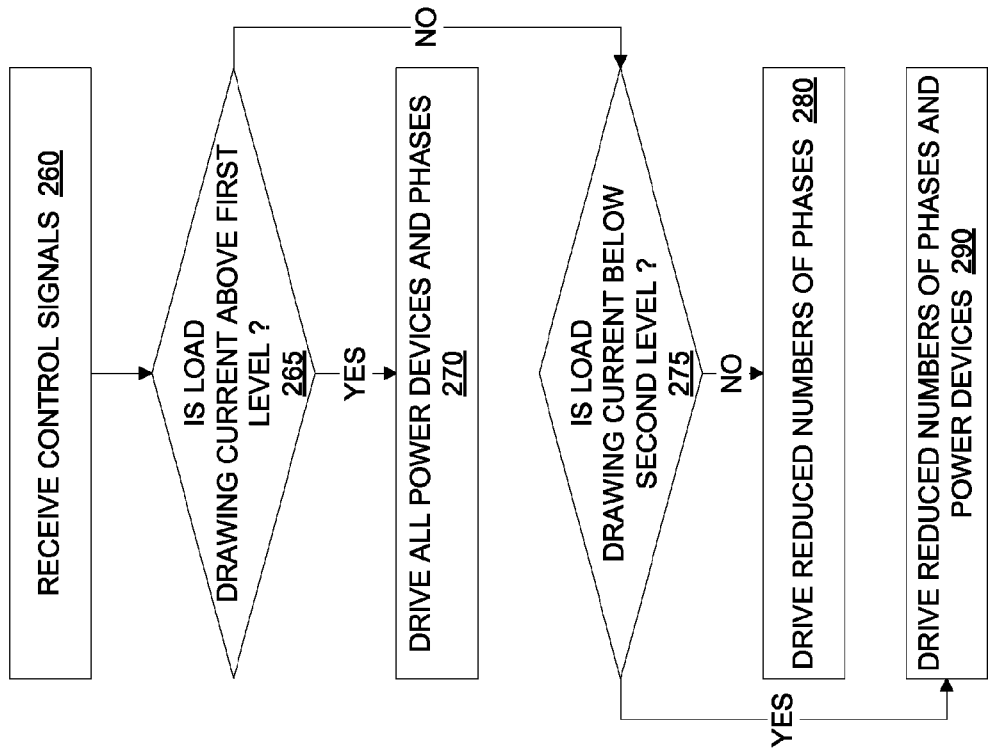
FIG. 2 is a flowchart illustrating the operation of a power supply regulator according to an embodiment of the present invention.
Figure 2A:
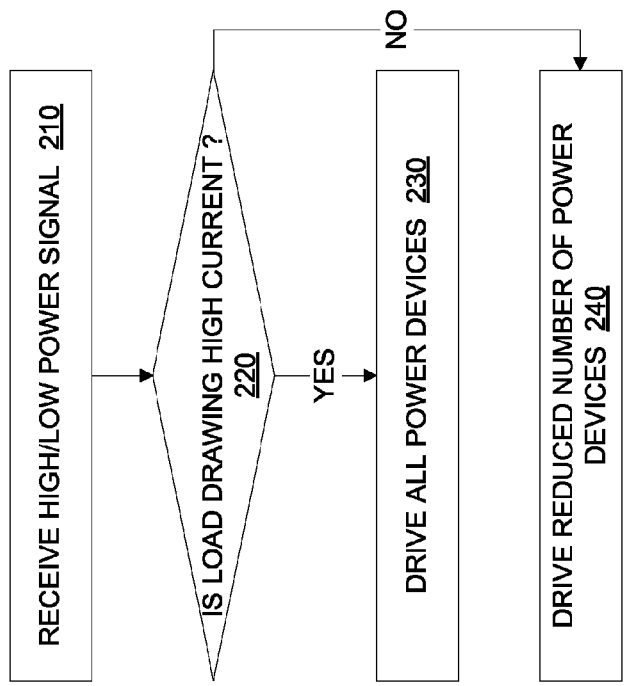

FIGS. 2A and 2B are flowcharts illustrating the operation of power supply regulators according to an embodiment of the present invention. FIG. 2A is a flowchart illustrating the operation of an embodiment of the present invention in a single-phase power supply regulator. In this figure, a control signal is received from the load, which may be a processor. When the load current is relatively high, all power devices are driven. If the node is relatively light, the number of power devices driven may be reduced in order to increase overall efficiency.

Specifically, in act 210, a signal indicating whether the load power is high or low is received. In act 220, it is determined whether the load is drawing high current. If it is, then in act 230, all power devices are driven. If the load is not drawing a high current, the number of power devices that are driven may be reduced in act 240.

FIG. 2B is a flowchart illustrating the operation of an embodiment of the present invention in a multiphase system. In this example, the power supply regular is a multi-phase regulator, where one or more of the phases includes multiple parallel devices driven by a multiple number of drivers, and where one or more of the drivers may be selectively disabled. Depending on the control signals provided by the load or other circuit, the number of phases may be reduced, and the number of power devices that are driven may be reduced. In a specific embodiment of the present invention, as load current is decreased, the number of phases is decreased to one. At that point, as the load current further decreases, the number of power devices in that phase that are driven is reduced. In other embodiments of the present invention, as the load current decreases, the number of phases and number of power devices may be decreased in other ways.

Specifically, in act 260, a number of control signals bits are received, for example from a load or other circuit. These signals may indicate the level of current required by the load. For example, when two signals are provided and both are high, the current level required may be high. One low signal and one high may indicate a medium level of current draw, while both low may indicate that a lower level of current is needed. In act 265, it is determined whether the load current as above a first level. If it is, then all devices in all phases are driven in act 270.

If the load current is below the first level, it is then determined in act 275 whether the load current is below a second level. If it is not, that is, it is above the second level and below the first level, the number of phases that are driven may be reduced in act 280. If the load current is very light, that is, it is below the first threshold and the second threshold, then the number of phases and the number of power devices may be reduced in act 290. For example, the number of phases may be reduced to one, and a number of the power devices in that phase may be reduced. While in this example two current thresholds are shown, in other embodiments of the present invention, other numbers of thresholds may be used.

Figure 3:
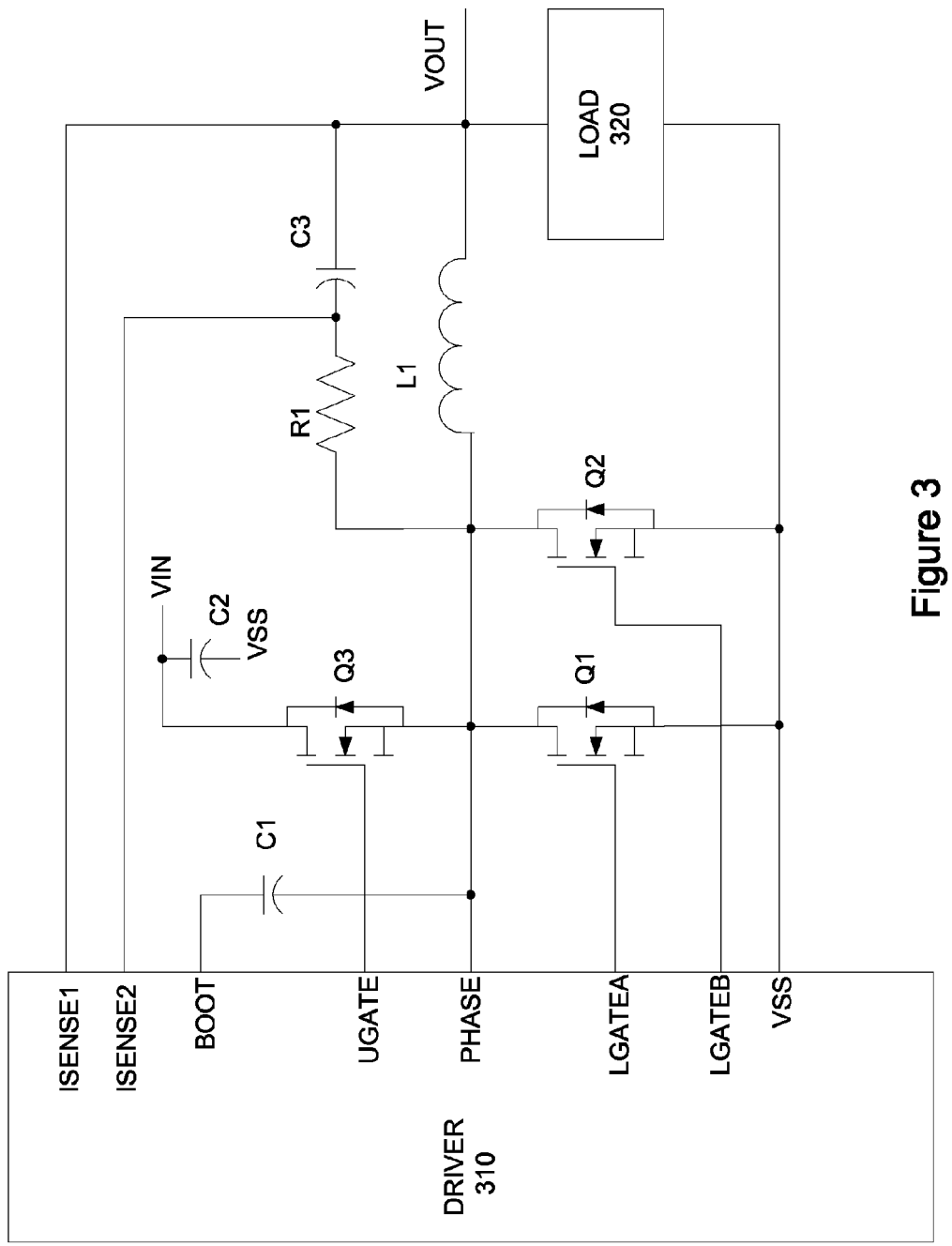
FIG. 3 is a block diagram illustrating another power supply regulator according to an embodiment of the present invention.

FIG. 3 is a block diagram illustrating another power supply regulator according to an embodiment of the present invention. This figure includes a driver 310, power MOSFETs Q1, Q2, and Q3, an inductor L1, sense devices R1 and C3, and load 320. In this configuration, the current in inductor L1 is sensed by measuring the voltage across C3 at the INSENSE1 and ISENSE2 pins of the driver 320. In other embodiments of the present invention, other current sense schemes may be employed. If this sensed current is sufficiently high, both transistors Q1 and Q2 are driven. If the load current provided by L1 is sufficiently light, only one of the transistors Q1 and Q2 are driven. Specifically, if the load current detected at INSENSE1 and ISENSE2 is sufficiently light, one of the gate drivers providing signals to Q1 and Q2 are disabled while the other is enabled. This reduces the MOSFET gate capacitance that is driven under light load conditions, thereby increasing overall efficiency.

While two parallel transistors have been shown in this figure, in other embodiments of the present invention, other numbers of transistors may be included. Further, while individual outputs LGATEA and LGATEB are shown driving transistors Q1 and Q2, each output LGATEA and LGATEB may drive more than one transistor. Alternately, various embodiments of the present invention may include three or more driver outputs. Also, while in this example, multiple parallel devices are shown for the pull-down path, multiple parallel devices that are selectively enabled may be used for the pull-up device, or for both the pull-up and pull-down devices. In these examples, MOSFET power devices are shown, though in other embodiments of the present invention, other types of devices, such as bipolar transistors, may be included. Either or both n-channel and p-channel, and enhancement and depletion mode devices may be incorporated by various embodiments of the present invention.

Moreover, the circuit as illustrated in FIG. 3 is a single phase power regulator. The present invention may also be used to improve multi-phase regulators. In such circuits, power devices drive the processor or other load through separate inductors connected to the output VOUT. In such a configuration, depending on the current drawn by the load, various phases and parallel devices in one or more phases may be enabled or disabled.

Figure 4B:
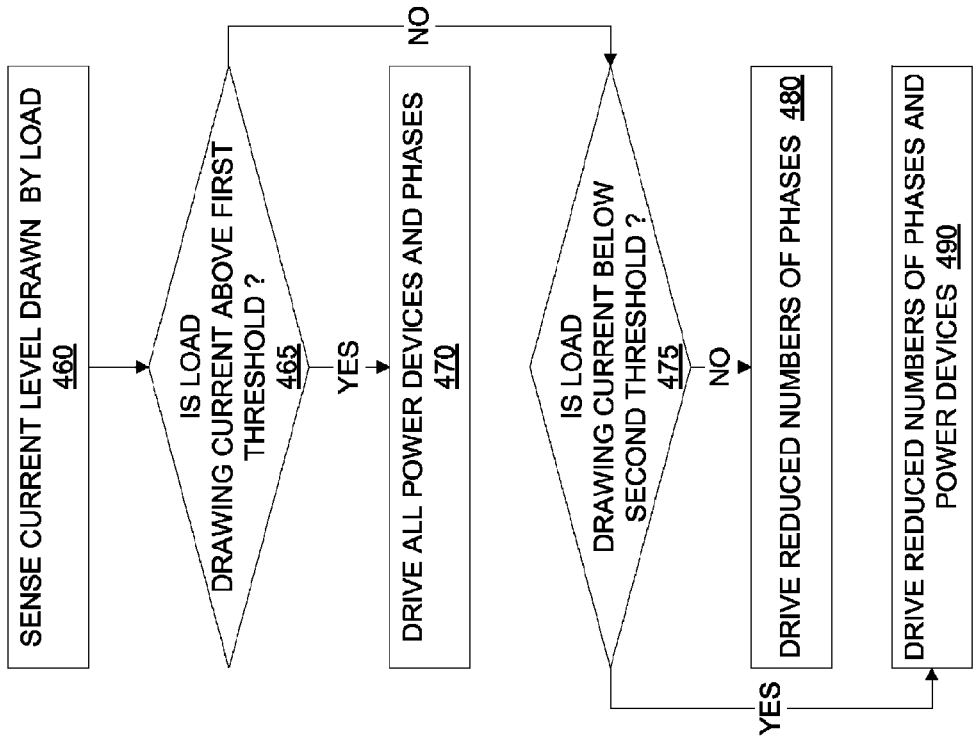
FIGS. 4A and 4B are flowcharts illustrating the operation of power supply regulators according to an embodiment of the present invention.
Figure 4A:
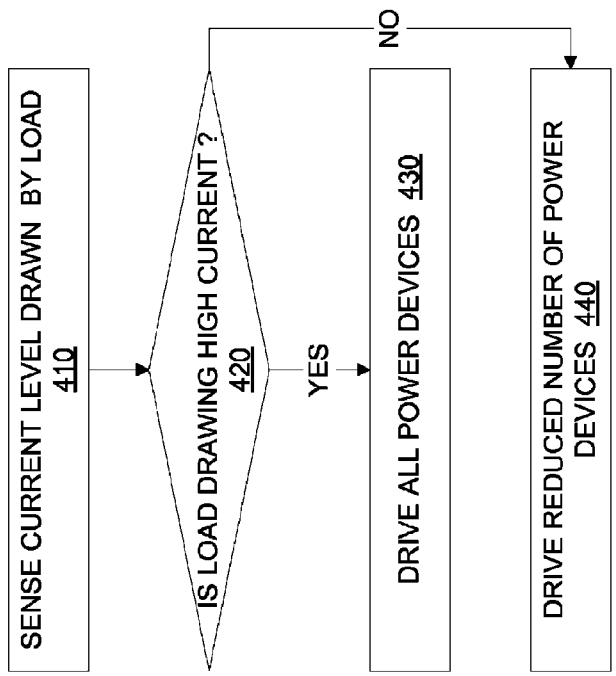

FIGS. 4A and 4B are flowcharts illustrating the operation of power supply regulators according to an embodiment of the present invention. FIG. 4A is a flowchart illustrating the operation of an embodiment of the present invention in a single-phase power supply regulator. In this example, a current level drawn by the load is sensed. If the load is relatively high, all power devices are driven, while it if it is relatively low, a fewer number of power devices are driven. In this example, one threshold is used; though another embodiment of the present invention, other numbers of thresholds may be used to select the number of driven devices. For example, two thresholds may be used to determine whether one, two, or three power transistors are driven.

Specifically, in act 410, a current level drawn by a load is sensed. In act 420, it is determined whether the current is high. If it is, then all power devices are driven in act 430. If the current drawn is relatively low, the number of power devices may be reduced in act 440.

FIG. 4B is a flowchart illustrating the operation of an embodiment of the present invention in a multiphase system. In this example, the power supply regular is a multi-phase regulator, where one or more of the phases includes multiple parallel devices driven by a multiple number of drivers, and where one or more of the drivers may be selectively disabled. Depending on the current level that is sensed, the number of phases may be reduced, and the number of power devices that are driven may be reduced. In a specific embodiment of the present invention, as load current is decreased, the number of phases is decreased to one. At that point, as of the load current further decreases, the number of power devices in that phase that are driven is reduced. In other embodiments of the present invention, as the load current decreases, the number of phases and number of power devices may be decreased in other ways.

Specifically, in act 460, a current level drawn by the load is sensed. In act 465, it is determined whether the load current is above a first threshold. If it is, then all devices in all phases are driven in act 470.

If the load current is below the first threshold, it is then determined in act 475 whether the load current is below a second threshold. If it is not, that is, the load current is above the second threshold and below the first threshold, the number of phases that are driven may be reduced in act 480. If the load current is very light, that is, it is below the first threshold and a second threshold, then the number of phases and the number of power devices may be reduced in act 490. For example, the number of phases may be reduced to one, and a number of the power devices in that phase may be reduced. While in this example two current thresholds are shown, in other embodiments of the present invention, other numbers of thresholds may be used.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:
a first control circuit to drive a first pull-down power transistor of a plurality of pull-down transistors in a phase;
a second control circuit to selectively drive a second pull-down power transistor of the plurality of pull-down transistors in the phase, the second power transistor in the phase with the first power transistor such that a drain of the second power transistor is coupled to a drain of the first power transistor and a source of the second power transistor is coupled to a source of the first power transistor, the first and second power transistors to drive circuitry to generate an output voltage supply, the output voltage supply to provide a supply voltage to a load;
a control input for receiving a signal indicating a level of current required by the load,
wherein when the signal indicates that a level of current required by the load is lower than a first threshold, the first control circuit drives the first power transistor and the second control circuit does not drive the second power transistor, and
wherein when the signal indicates that a level of current required by the load is higher than the first threshold, the first control circuit drives the first power transistor and the second control circuit drives the second power transistor;
one or more third control circuits to drive one or more pull-up transistors in the phase with the plurality of pull-down transistors, the one or more pull-up transistors having a source coupled to the drains of the plurality of pull-down transistors; and
a fourth control circuit to selectively drive a second plurality of power transistors in a second phase, the second plurality of power transistors to drive circuitry to generate the output voltage supply,
wherein when the signal indicates that a level of current required by the load is lower than a second threshold, the fourth control circuit does not drive the second plurality of power transistors, and wherein when the signal indicates that a level of current required by the load is higher than the second threshold, the fourth control circuit drives the second plurality of power transistors.

2. The integrated circuit of claim 1 wherein the first and second transistors are power MOSFETs.

3. The integrated circuit of claim 1 wherein the load is a microprocessor.

4. The integrated circuit of claim 1 wherein the second threshold is larger than the first threshold.

5. The integrated circuit of claim 4 wherein the signal corresponds to a current level require by the load at a first time,
wherein the control input is configured to receive a second signal indicated a level of current required by the load at a second time,
wherein when the second signal indicates that a level of current required by the load is lower than a first threshold, the first control circuit drives the first power transistor and the second control circuit does not drive the second power transistor,
wherein when the second signal indicates that a level of current required by the load is higher than the first threshold, the first control circuit drives the first power transistor and the second control circuit drives the second power transistor;
wherein when the second signal indicates that a level of current required by the load is lower than the second threshold, the fourth control circuit does not drive the second plurality of power transistors, and
wherein when the second signal indicates that a level of current required by the load is higher than the second threshold, the fourth control circuit drives the second plurality of power transistors.

6. A method of generating a regulated power supply comprising:
receiving a first signal indicating a current level required by a load; and
if the required current level is less than a first threshold, then driving a first power transistor of a plurality of pull-down transistors in a phase and not driving a second power transistor of the plurality of pull-down transistors in the phase, where the first and second power transistors are coupled to a first inductor, and driving a fourth power transistor of one or more pull-up transistors in the phase with the plurality of pull-down transistors;
if the required current level is greater than the first threshold, then driving the first power transistor, driving the fourth power transistor, and driving the second power transistor;
if the required current level is greater than a second threshold, then driving a third power transistor, where the third power transistor is in a second phase and coupled to a second inductor; and
if the required current level is less than the second threshold value, then not driving the third power transistor.

7. The method of claim 6 wherein the load is a microprocessor.

8. The method of claim 6 wherein a source of the first power transistor is coupled to a source of the second power transistor and a drain of the first power transistor is coupled to a drain of the second power transistor, and wherein a source of the fourth power transistor is coupled to the drains of the first and second power transistors.

9. The method of claim 6 wherein the first and second transistors are power MOSFETs.

10. The method of claim 6, wherein the second threshold is larger than the first threshold.

11. The method of claim 10 wherein the first signal corresponds to a current level required by the load at a first time, the method further comprising:
receiving a second signal indicating the current level required by the load at a second time;
if the required current level at the second time is less than the first threshold, then driving the first power transistor and the fourth power transistor, and not driving the second power transistor;
if the required current level at the second time is greater than the first threshold, then driving the first power transistor, driving the fourth power transistor, and driving the second power transistor;
if the required current level at the second time is greater than the second threshold, then
driving the third power transistor; and
if the required current level at the second time is less than the second threshold, then
not driving the third power transistor.

12. The method of claim 11 wherein the first and second signals are provided by the load, and the load is a microprocessor.

13. An electronic device comprising:
a switching regulator driver configured to receive an input voltage and having a plurality of outputs for controlling a plurality of drive transistors;
a first transistor having a gate coupled to a first output of the plurality of outputs of the switching regulator driver;
a second transistor having a gate coupled to a second output of the plurality of outputs of the switching regulator driver, the second transistor coupled in a phase with the first transistor such that a drain of the second transistor is coupled to the drain of the first transistor and a source of the second transistor is coupled to the source of the first transistor;
a third transistor in the phase with the first and second transistors, the third transistor having a gate coupled to a third output of the plurality of outputs of the switching regulator, wherein the third transistor is configured as a pull-up transistor and the first and second transistors are configured as pull-down transistors;
a fourth transistor in a second phase;
a load configured to receive power from the first transistor and the second transistor;
wherein the switching regulator driver is configured to receive an indication of a power level to be provided to the load, and wherein the switching regulator is configured to control the first, second, third, and fourth transistors such that the first and third transistors provide power to the load and the second and fourth transistors are off when the power level to be provided is below a first threshold;
wherein the switching regulator driver is configured to control the first, second, third, and fourth transistors such that the first, second, and third transistors provide power to the load and the fourth transistor is off when the power level to be provided is above the first threshold and below a second threshold;
wherein the switching regulator driver is configured to control the first, second, third, and fourth transistors such that the first, second, third, and fourth transistors provide power to the load when the power level to be provided is above the second threshold.

14. The electronic device of claim 13, wherein the load includes a processor, the processor configured to provide the indication of the power level to be provided.

15. The electronic device of claim 13, wherein the first and second transistors comprise power MOSFETs.

16. The electronic device of claim 13, wherein the indication corresponds to a power level to be provided to the load at a first time, wherein the switching regulator driver is configured to receive a second indication of a power level to be provided to the load at a second time, and wherein the switching regulator is configured to control the first, second, third, and fourth transistors such that the first and third transistors provide power to the load and the second and fourth transistors are off when the power level to be provided as indicated by the second indication is below a first threshold;

wherein the switching regulator driver is configured to control the first, second, third, and fourth transistors such that the first, second, and third transistors provide power to the load and the fourth transistor is off when the power level to be provided as indicated by the second indication is above the first threshold and below a second threshold;

wherein the switching regulator driver is configured to control the first, second, third, and fourth transistors such that the first, second, third, and fourth transistors provide power to the load when the power level to be provided as indicated by the second indication is above the second threshold.

* * * * *